United States Patent [19]

Mayer

[11] Patent Number: 4,685,362
[45] Date of Patent: Aug. 11, 1987

[54] QUICK-MOUNT THREAD CUTTING ATTACHMENT FOR LATHES

[76] Inventor: Julius Mayer, 1208 Holly Hill Dr., Petersburg, Va. 23803

[21] Appl. No.: 746,585

[22] Filed: Jun. 19, 1985

[51] Int. Cl.⁴ ............................................. B23B 29/18
[52] U.S. Cl. .......................................... 82/5; 82/24 A
[58] Field of Search .................... 82/5, 11, 12, 24 A

[56] References Cited

U.S. PATENT DOCUMENTS

| | | | |
|---|---|---|---|
| 2,330,156 | 9/1943 | Stoen | 82/24 A |
| 2,533,254 | 12/1950 | Whigam | 82/5 |
| 2,808,598 | 10/1957 | Mannaioni | 10/101 |
| 2,882,776 | 4/1959 | Jeanneret | 82/5 |
| 2,903,933 | 9/1959 | Mackenzie | 82/5 |
| 3,010,344 | 11/1961 | Christensen | 82/5 |
| 3,073,194 | 1/1963 | Ciccarelli | 82/5 |
| 3,121,357 | 2/1964 | Skoglund et al. | 82/5 |
| 3,190,157 | 6/1965 | Ciccarelli | 82/5 |
| 3,320,831 | 5/1967 | Bullard | 82/24 A |
| 3,323,393 | 6/1967 | Soykan | 82/24 A |
| 3,472,104 | 10/1969 | Berly | 82/5 |
| 3,972,250 | 8/1976 | Reynolds | 82/5 |
| 4,036,086 | 7/1977 | Thumm et al. | 82/24 R |

Primary Examiner—M. Jordan
Assistant Examiner—Jerry Kearns
Attorney, Agent, or Firm—Shoemaker and Mattare, Ltd.

[57] ABSTRACT

A thread cutting attachment for use with conventional type engine lathes for the purpose of semiautomatically cutting threads externally on a workpiece, or with a modified embodiment, internally of a workpiece. Each attachment has structure for securely affixing same to the conventional cutting tool holder of such a lathe. A main body of the attachment has a movable cutting tool holder therewithin. The cutting tool holder is suitably actuated through mechanical means from the energization of a fluid cylinder having a piston with rod extending therefrom. Suitable fluid control structure is connected to this fluid cylinder for actuation thereof under the control of either electrical, pneumatic, or hydraulic control apparatus. The present invention cuts threads like the old conventional thread cutting method, except in the method of the present invention, the single point thread cutting tool automatically disengages after the thread cutting stroke, and the cutting tool automatically engages at the beginning of the thread cutting stroke. The present invention eliminates the need for quickly disengaging the cutting tool manually at the end of the thread cutting stroke. The present invention does not need an undercut in the workpiece, thus allowing the cutting tool to cut dead end threads internally or externally.

3 Claims, 10 Drawing Figures

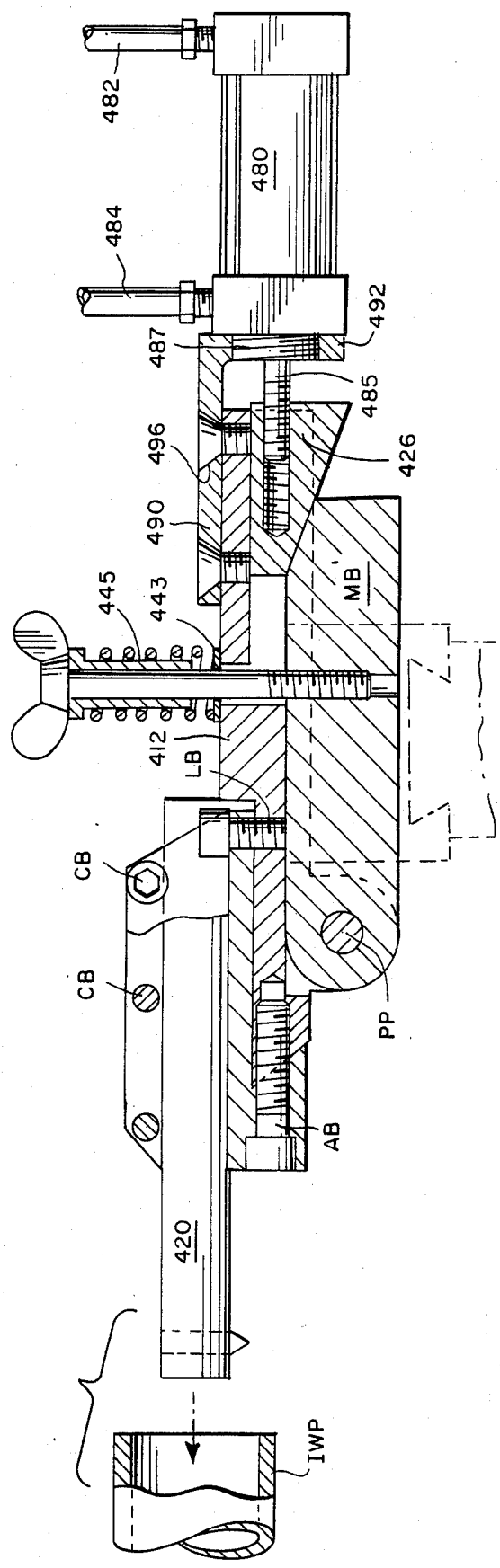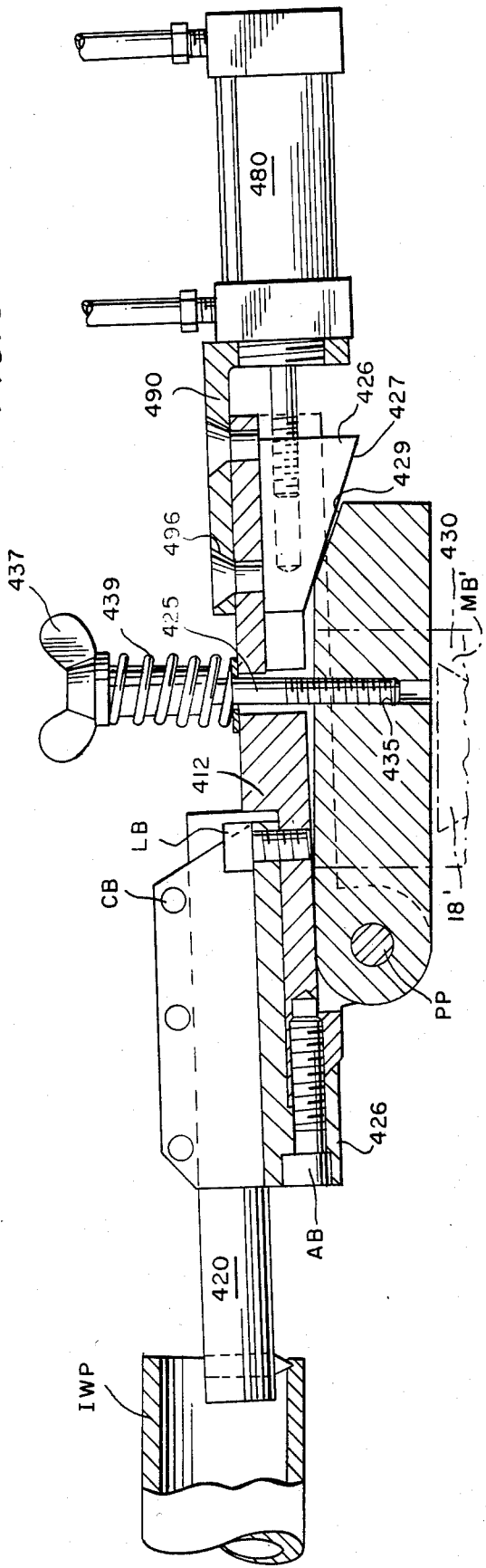

QUICK-MOUNT THREAD CUTTING ATTACHMENT FOR LATHES

BACKGROUND OF THE INVENTION

1. Field of the Invention

This invention relates generally to apparatus for cutting threads in a workpiece held in a chuck of a lathe, and especially for an attachment adaptable for such purpose with conventional type engine lathes.

2. Description of the Prior Art

A common problem with known devices for cutting threads is that they are unduly complicated, very expensive, and not readily adaptable to conventional type lathe equipment.

Another common problem of known type attachments for lathes for the purpose of cutting threads is that they require time consuming attachment procedures, are usually complicated in their attachment structure, and oftentimes quite difficult to operate properly.

Another common problem with known type thread cutting attachments for lathes is that they often are very large, bulky, and hard to maintain, and even then, lack the precision desired. Existing prior patents which may be pertinent to this invention are as follows:

| | | |
|---|---|---|
| 2,808,598 | R. Mannaioni | 10/8/57 |
| 2,882,776 | J. L. Jeanneret | 4/21/59 |
| 3,073,194 | Don Pietro Ciccarelli | 1/15/63 |
| 3,121,357 | D. M. Skoglund, et al | 2/18/64 |
| 3,190,157 | P. Ciccarelli | 6/22/65 |
| 3,472,104 | M. H. Berly | 10/14/69 |
| 3,972,250 | W. B. Reynolds | 8/3/76 |
| 4,036,086 | H. Thumm, et al | 7/19/77 |

The patents to Mannaioni, U.S. Pat. No. 2,808,598 and Jeanneret, U.S. Pat. No. 2,882,776, disclose structure associated with lathes for the purpose of automatically withdrawing the cutting tool from engagement with a workpiece at certain times. This embraces a concept of the present invention; however, these patents fail to disclose the other important features of the present invention.

Likewise, none of the other known prior art devices offers the new and novel features of the present invention.

SUMMARY OF THE INVENTION

An object of the present invention is to provide an attachment for lathes which will permit the quick and relatively easy cutting of threads in a work-piece. Another object of this invention is to provide a relatively fast and yet very accurate thread cutting attachment for a lathe. Automatic withdrawal of the cutting tool at the end of each cut is also provided.

A further object of this invention is to provide an uncomplicated, fairly inexpensive device for rapidly, yet accurately cutting threads in a workpiece held in a lathe A still further object is to provide a thread cutting attachment with automatic cutter tool withdrawal upon completion of each thread cutting pass, together with appropriate controls, switches, and the like for such operation.

Another still further object of this invention is to provide attachments for lathes which can cut either internal or external threads on suitable workpieces held by the lathe, which is simple in operation so that unskilled and inexperienced operators can easily cut acceptable threads, and which attachments are only required to be set one time for a proper thread cutting sequence.

Another further object is to provide a thread cutting attachment which is faster in operation, minimizes operator errors, and eliminates the undercut as generally necessary to be made in a workpiece when conventional thread cutting procedures in ordinary metal lathes are used.

Still another object of this invention is to provide means for cutting a "Dead End" thread.

The apparatus of the present invention is an attachment for lathes which can be easily and quickly attached to such lathe and also just as easily and quickly removed therefrom when no longer needed. A pneumatic actuator operates cam structure for automatic withdrawal of the cutting tool holder upon completion of a thread cutting pass. Appropriate switches and controls, preferably pneumatic or otherwise fluid actuated, function to semi-automatically actuate the mechanism as desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3A is a side elevational view, partly in cross-section, of another embodiment of the present invention.

FIG. 7 is a top plan view, partly in cross-section, with the cam actuating structure in the unactuated position.

FIG. 8 is a view similar to FIG. 7, but with the cam actuating structure in the actuated position.

DESCRIPTION OF THE PREFERRED EMBODIMENTS

Figure 1:
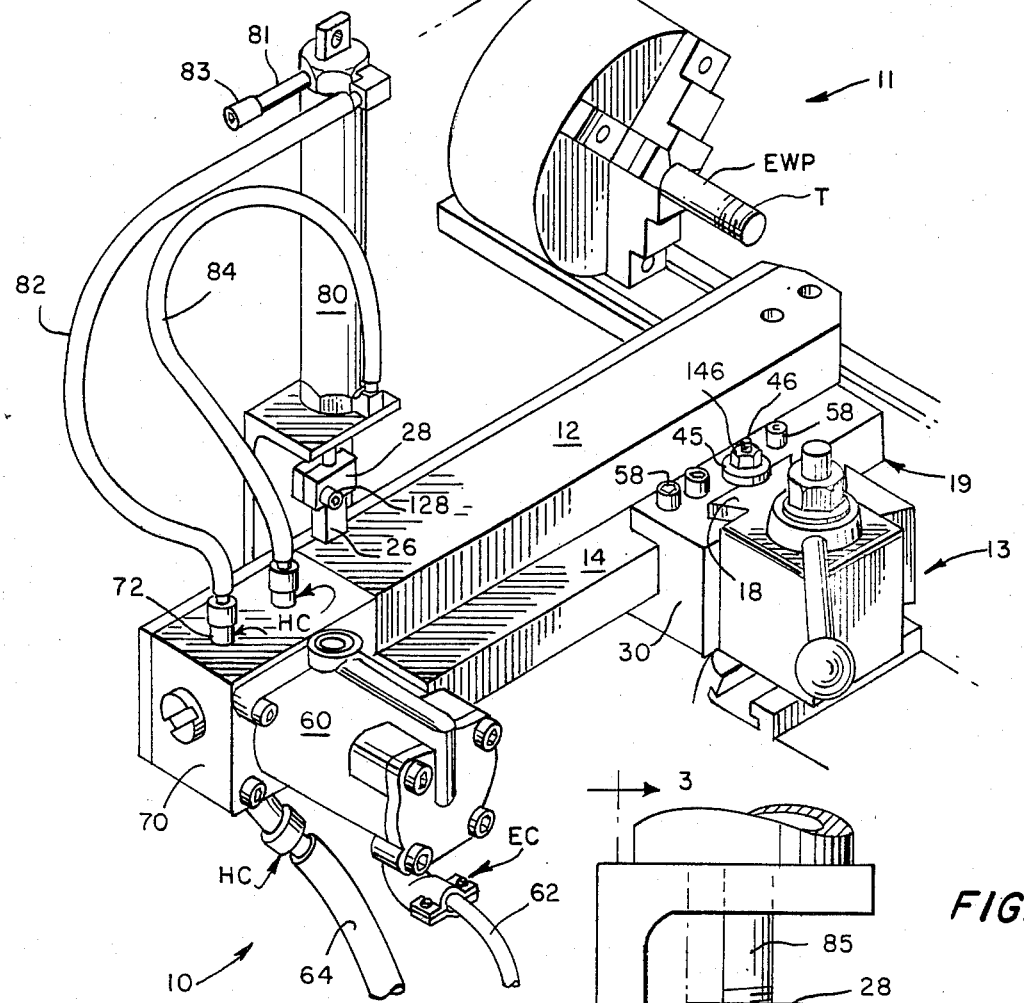
FIG. 1 is a perspective view of the thread cutting attachment for lathes of the present invention as mounted on an engine lathe.
Figure 2:
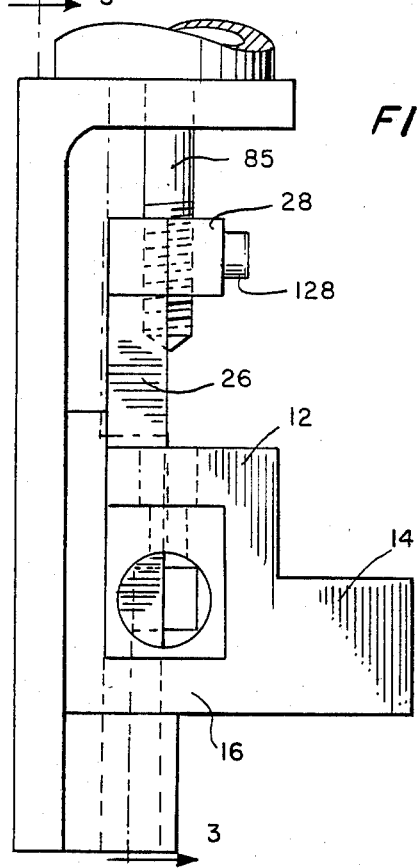
FIG. 2 is an end elevational view of the attachment of the present invention as viewed from the rear end (i.e., end opposite from the cutter blade).

Looking at FIG. 1 of the drawing, reference numeral 10 indicates in general an attachment of the present invention as mounted upon a conventional engine lathe. The chuck 11 of the lathe suitably holds a workpiece EWP with an area T in which it is desired for external threads to be cut. An adjustable clamp 13 has a dovetail wedge portion 18 which complements the mating wedge block 19 of the attachment. The main body MB of the attachment has an upper portion 12 with an extending longitudinal projection 14, and a bottom portion 16. Between the top portion 12 and the bottom portion 16 of the main body 13 is provided a channel 15. Within this channel 15, a horizontally movable cutting tool holder 20 is mounted.

Figure 3:
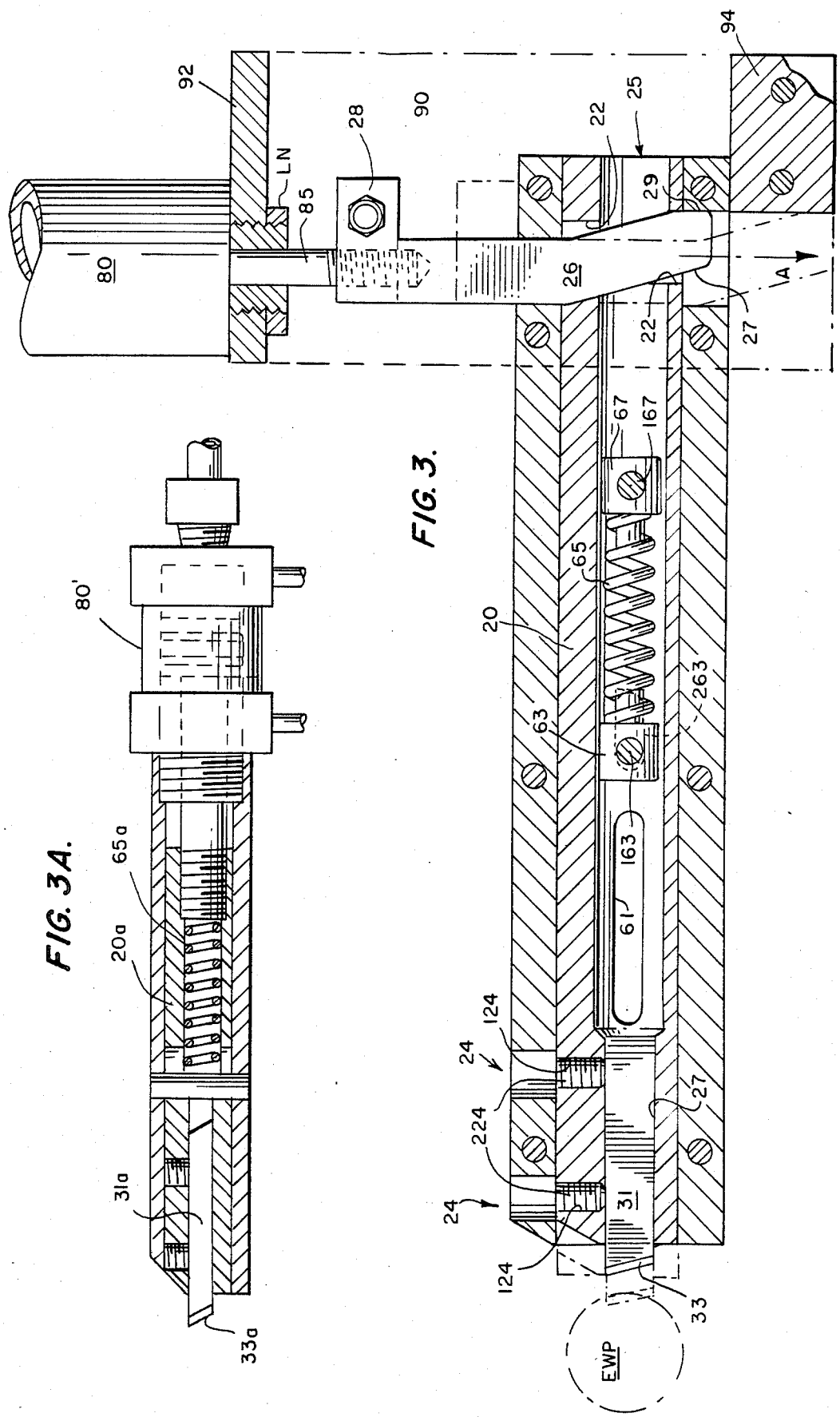
FIG. 3 is a side elevational view, partly in cross-section, taken generally along line 3—3 of FIG. 2.
Figure 4:
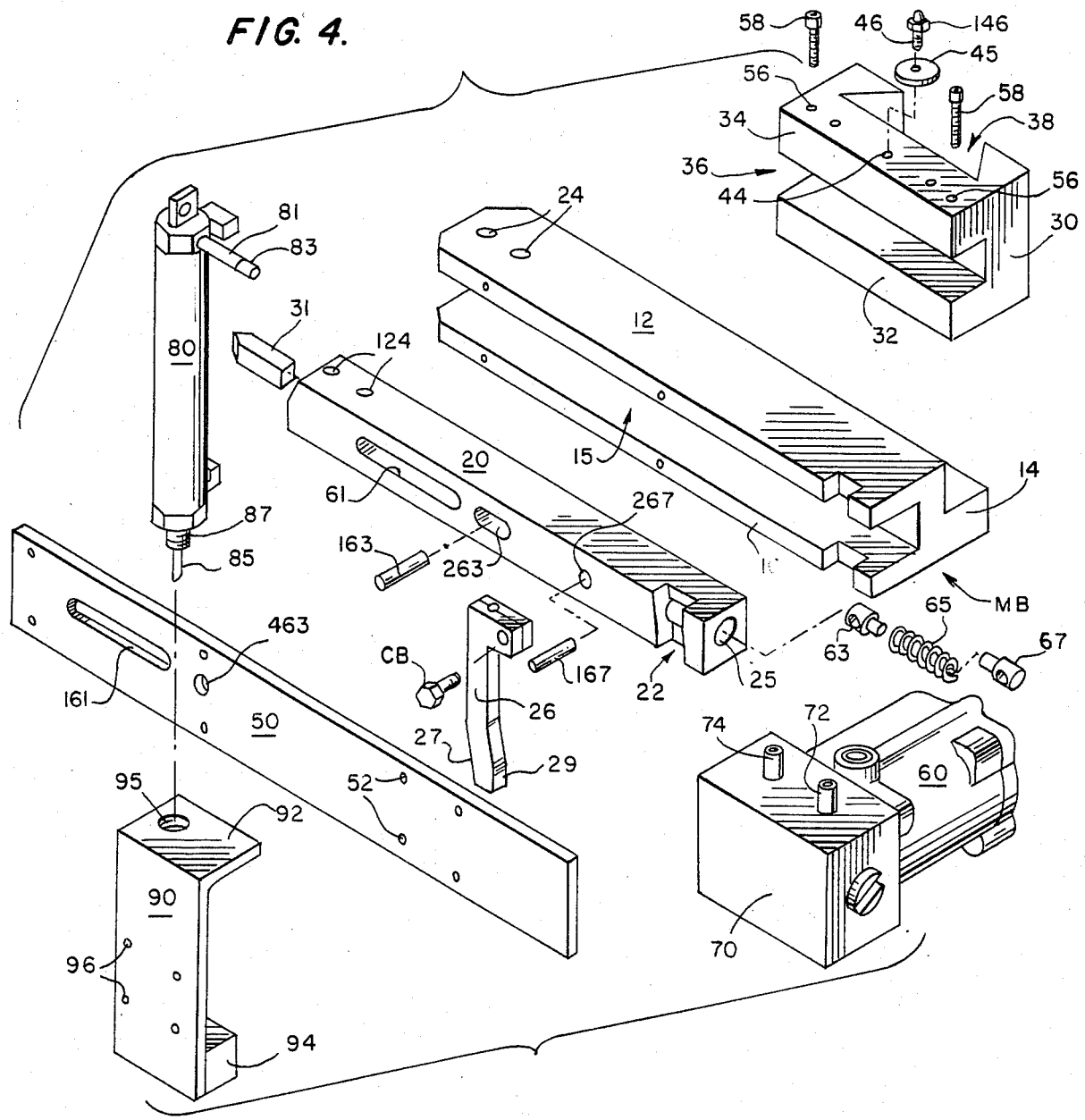
FIG. 4 is an exploded perspective view of the component parts of the thread cutting attachment of the present invention.
Figure 9:
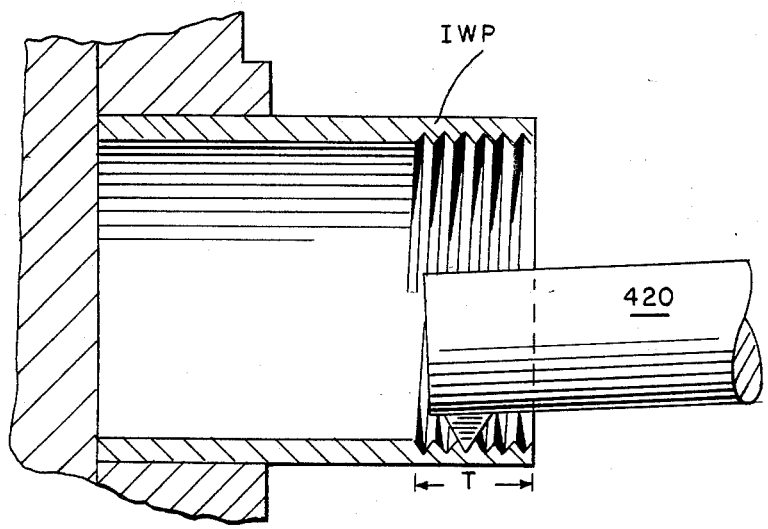
FIG. 9 is a fragmentary view, partly in cross-section, of a workpiece having a "Dead End" thread cut therewithin by the work tool of the present invention.

Now looking at FIGS. 3 and 4, at the aft end of the holder 20 a traverse cross recess 22 is shown. This is for receiving the cam actuator 26 for movement of the cutter tool holder. A longitudinally extending bore 25 extends from this aft end towards the front end of the holder. Near the front end, this bore terminates in a square or rectangular channel 27. This extends to the fore end of the holder. It is within this channel 27 that the cutter knife or tool 31 is mounted. The cutter tool 31 preferably has a sharp knife-like cutting edge 33 for engagement with the workpiece. The attachment main body MB is provided through the front end of upper portion 12 with apertures 24. These apertures line up with suitably threaded apertures 124 in the tool holder 20. As best seen in FIG. 3, the threaded apertures 124 receive fastening screws 224 therewithin. Of course, these screws 224 securely fix the cutter tool 31 to the holder 20 after being appropriately tightened.

As best seen in the side elevation of FIG. 3 and the exploded perspective of FIG. 4, the cam 26 slides within the traverse recess 22 of the cutter tool holder 20. Thus, when the cam 26 moves downwardly, arrow A of FIG. 3, the cam surface 29 thereof effects backward movement of the cutting tool holder 20. This, of course, suitably withdraws the cutting tool 31 itself from engagement with the workpiece EWP. Of course, cam surface 27 will effect forward movement of the tool holder 20. The retracted position is shown in solid lines in FIG. 3, while the cutter tool engagement with the workpiece is indicated by the dotted lines in this view.

In order to increase the speed of tool retraction at the end of a cutting stroke, the horizontally slidable knife tool holder 20 is preferably provided with a T-body element 63, a compression spring 65 and another T-body element 67. The T-body element 67 is suitably pinned to the tool holder 20 by a cross pin 167, while the other T-body element 63 is held by cross pin 163 and hole 463 in plate 50. A longitudinal slot 263 in the holder 20 is also provided. This permits the tool holder to move into engagement with the workpiece EWP before compression on the spring takes place, and as the threads are cut, the tension on the compression spring 65 will increase and thus result in a quick disengagement of the tool holder when the cam 26 is actuated, as already described. Also, as shown in FIGS. 3 and 4, a tool removal opening 161 is provided in plate 50 to enable the holder to be physically retracted by an external tool when and if the holder should bind within the main body MB. A corresponding slot 61, though of somewhat shorter length, may also be provided within the tool holder body 20 for engagement by the tool through the slot 161.

Figure 5:
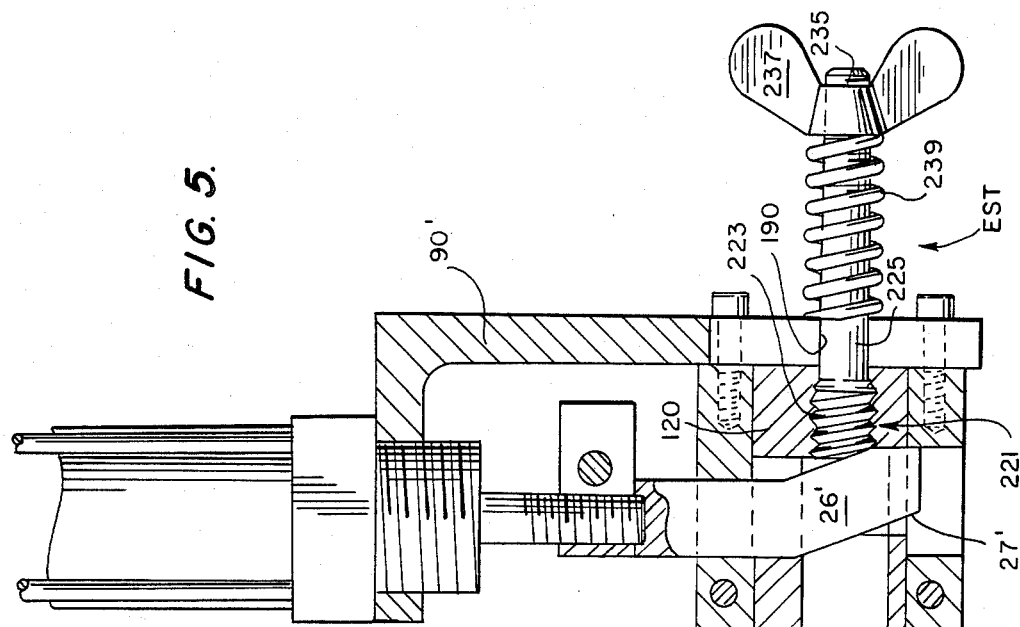
FIG. 5 is a side elevation of a modification of the FIGS. 1–4 embodiment wherein the compression spring retraction structure is eliminated and an externally mounted spring tensioning structure is added.

FIG. 5 shows a modification of the embodiment of FIGS. 1-4 wherein the internally mounted compression spring 65 with T-body elements 63 and 67 are replaced with an external spring tension structure EST. This external structure comprises a headed bolt 225 having a head 221 with threads 223 thereon which screw into the complementary threads within the end 120 of the tool holder 20'. An appropriate aperture 190 is provided through the modified bracket 90' for the purpose of receiving the bolt 225. The other end of bolt 225 is threaded 235 for reception of a wing adjusting nut 237 thereon. A compression spring 239 can be suitably compressed between the wing nut 237 and the external wall surface adjacent opening 190 of the bracket 90'. Obviously, by adjusting the wing nut 237, sufficient tension can be applied to the tool holder 20' to effect a very rapid and quick retraction of the cutting tool at the end of a cutting stroke. Thus, while normally the cam structures 26' and the cam surfaces thereon will effect slidable horizontal reciprocation of the cutting tool holder 20', with this additional compression tensioning structure, a much quicker retraction without any binding of the cam structure can be effected.

A pneumatic cylinder 80 with piston and rod therein is shown in FIGS. 1, 3 and 4. This pneumatic cylinder 80 has suitable air input/exhaust lines 82 and 84 connected thereto. Pneumatic or hydraulic type couplings HC suitably connect these lines to a high pressure valve 70. These couplings are mounted on stubs 72 and 74 extending from the valve box. Another high pressure coupling HC couples a source of high air pressure or other fluid pressure by a line 64. An electric solenoid 60, suitably energized through input line 62 and electrical coupling EC, is preferably used to actuate the valve structure within valve box 70. Of course, upon suitable actuation of this air valve, the piston within the cylinder 80 will be moved from one end to the other and vice versa.

The piston rod 85 extends through the lower end of the cylinder 80 through suitable high pressure seals and, in turn, engages with the clamp 28 at the top of the cam 26. A cover plate 50 (FIG. 4) is used to enclose the channel 15 between the main body portions 12, 16, and by use of suitable tapped apertures 52 retains the cylinder actuator bracket 90 fixed to the main body MB. Apertures 96 in the bracket 90 receive appropriately threaded screws therethrough for engagement in the tapped apertures 52. A threaded aperture 95 through flange 92 at the top of the bracket complementarily receives the threaded extension 87 on the pneumatic cylinder 80 for securely fastening same thereto. A lock nut LN may be added if desired. A block 94 at the bottom of the bracket 90 suitably functions as a guide for the cam surface 29, as best seen in FIG. 3.

The dovetail recessed mounting block 19 has a body portion 30 with side extensions 32 and 34 extending therefrom to provide a central recess 36 therebetween. This recess 36 receives the extension 14 of the attachment main body MB. Appropriate clamp screws 58 through apertures 56 of the mounting block secure the extension 14 of the body to this mounting block. A clamp screw 46 with adjustment nut 146 thereon, together with a clamp washer 45, is mounted in tapped aperture 44 in the central portion of the mounting block. This clamp structure retains the mounting block 19 in engagement with the clamp structure 13 of the lathe.

Of course, as can be readily visualized, upon appropriate actuation of the pneumatic cylinder 80, the cutting tool 31 will be moved into engagement with the workpiece WP for the purpose of cutting the thread area T thereof.

At the end of the cut, the actuating cylinder 80 is actuated in the reverse direction to semi-automatically withdraw the cutting tool from engagement with the workpiece as depicted in FIG. 3. Of course, appropriate pneumatic switches, limit controls, appropriate tubing, and the like, are used with the structure shown so that once the operator initially engages the cutting tool with the workpiece, the stopping or withdrawal of the tool will automatically occur at the proper time, and the worker can very easily start the tool at the beginning for a deeper cut with a semi-automatic procedure following thereafter.

FIGS. 6-9 show another embodiment of the present invention. This embodiment is for the purpose of cutting threads internally of a workpiece. As shown, an internal workpiece IWP has a portion T in which it is desired to cut suitable threads. A main body MB' is suitably attached by a mating wedge block 430 to a dovetail wedge portion 18' on the adjustable clamp 13.

As can be best seen in FIGS. 7 and 8, the main body MB' has a tapered cam surface 429 at one end thereof and a pivot pin PP aperture therethrough at the other end. Mounted on the pivot pin PP is structure 412 for holding the cutting tool. Slidably mounted upon the pivot structure 412 is a holder 426 which can be adjusted horizontally of the holder 412. An adjusting bolt AB is used for this longitudinal adjustment and a lock bolt LB maintains the adjustment once made. Clamp bolts CB appropriately hold the cutting tool 420 in place on the adjusting structure 426. The body 412 which is pivotally mounted from the main body MB' has a cam structure 426 attached at the end opposite the pivot point. The cam 426 has a cam surface which is tapered 427 for complementary engagement with the tapered cam surface 429 of the main body MB'. Attaching screws 496 secure the cam block 426 on body 412. A pneumatic piston structure 480, similar to that structure 80 already described, has input/exhaust lines 482 and 484, as in the embodiment already described. Of course, similar valve structure like 70 with solenoid 60 and input from a pneumatic source, as depicted in FIG. 1 for the first embodiment, are included with this embodiment, though not shown herein.

Figure 6:
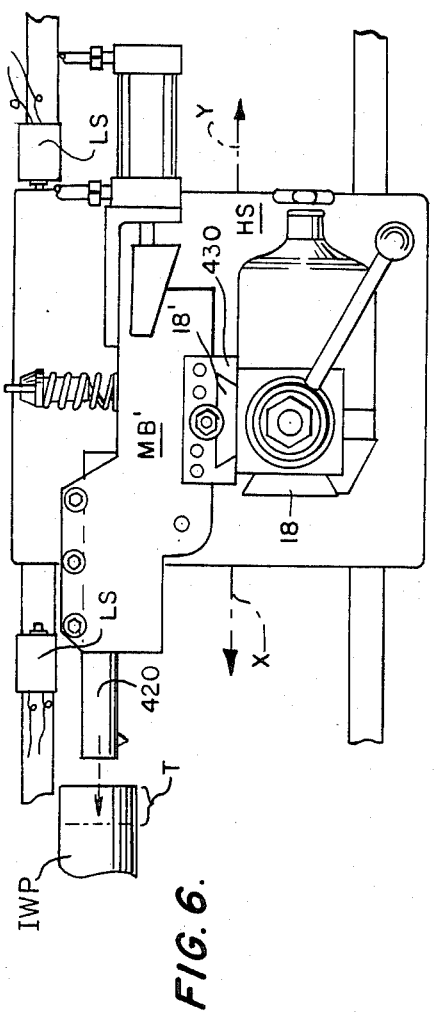
FIG. 6 is a top plan view of another embodiment of the present invention which is used for cutting internal threads in a suitable workpiece.

In FIG. 6, the limit stops LS are depicted mounted on each end of the traverse of the horizontal support HS which moves in the direction of the arrows X and Y. By using the limit stops LS, as each end of the cutting stroke is reached, the pneumatic valving will be actuated to effect retraction of the cutting tool 420 from the engagement with the internal workpiece IWP. A tension bolt 425 is threaded into the main body MB' by the threaded aperture 435 therewithin. A compression spring 439 suitably surrounds the external portion of the bolt 425 and the winged head 437 allows the compression of spring 439 to be changed. Preferably, a washer 443 and a limit bushing 445 are provided with compression spring 439. Of course, the washer 443 takes the pressure from one end of the spring which is against the pivotal holder 412, while the bushing 445 acts as a limit structure to prevent too much tension being applied to the spring structure.

FIG. 3A shows another embodiment wherein the tool holder 20a is actuated back and forth directly by a piston rod of pneumatic cylinder 80'. A spring 65a biases the holder 20a, holding cutter tool 31a with cutting edge 33a, in one direction similar to spring 65 of the first embodiment.

As can be easily visualized, the primary embodiment of FIGS. 1-4, or the further embodiments of FIGS. 3A and 6-9, will perform very efficiently and rapidly to cut either external or internal threads in a suitable workpiece. Operators that have very little knowledge of thread cutters can very accurately and precisely cut threads using the embodiments of the present invention without long training sessions.

It should be understood that the thread cutting attachment is used in three external and internal sizes corresponding to light, medium and heavy duty units. Further, where pneumatic cylinders are disclosed as used in the application, hydraulic cylinders are equally adaptable to such use.

The control system can be fixed to the lathe by magnetic means or by using clamps or the like and various safety control means can be incorporated in the system, such as electronic sensors, micro-switches or manual control safety valves.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A quick-mount, semi-automatic thread cutting attachment for lathes comprising:
   a main body;
   means with said body for mounting same upon the tool holding structure of a lathe;
   means for supporting a cutter tool movably with respect to said main body;
   actuator means for effecting such movement of the cutting tool supporting means within said body;
   means for energizing said actuator means when appropriate;
   said actuator means comprising a fluid cylinder having a piston therewithin and a piston rod extending therefrom, mechanical structure directly connecting the extending end of said piston rod with a wedge cam and cam follower structure for actuating said tool holder supporting means;
   said actuator means being under the control of a fluid valve;
   control means for operating said fluid valve;
   said control means comprising an electric solenoid connected to said fluid valve for actuating same;
   means for increasing the speed of tool retraction at the end of a cutting stroke;
   said means for increasing the speed of tool retraction at the end of a cutting stroke comprising a pair of T-body spring support elements, pins connecting them to the tool holder supporting means, and a compression spring mounted therebetween.

2. A thread cutting attachment for lathes as set forth in claim 1, wherein said wedge cam is arranged to move transversely of said cam follower structure which is a traverse cross recess in the aft end of the tool holder supporting means.

3. An attachment for lathes for cutting external threads on a workpiece comprising: a main body, an attaching structure for said main body for mounting same upon a metal lathe, a cutter tool holder mounted for horizontal slidable movement within and with respect to said main body, pneumatic actuator means for effecting such horizontal slidable movement of the cutting tool holder, and means for supplying air under pressure to said actuator means, said actuator means including a wedge cam movable traversely through a traverse recess in the cutter tool holder for effecting reciprocal movement thereof by said wedge cam, additional retraction means being provided with the cutting tool holder for assisting the cam structure in retracting the tool holder away from the workpiece in a more rapid manner, said additional refraction means comprising mounted within said holder a compression spring, a pair of T-body spring support elements holding said spring therebetween, said pins for connecting said elements to the tool holder.

* * * * *

UNITED STATES PATENT AND TRADEMARK OFFICE
CERTIFICATE OF CORRECTION

PATENT NO. : 4,685,362

DATED : August 11, 1987

INVENTOR(S) : JULIUS MAYER

It is certified that error appears in the above-identified patent and that said Letters Patent is hereby corrected as shown below:

Please correct the address of the Patentee as it appears on the face of the Patent from 1208 Holly Hill Dr., Petersburg, Virginia 23803 to the correct address of:

208 Holly Hill Drive
    Petersburg, Virginia 23803.

Signed and Sealed this

Eighth Day of December, 1987

Attest:

DONALD J. QUIGG

Attesting Officer      Commissioner of Patents and Trademarks